March 27, 1956  R. A. SANDBERG  2,739,672
HAND BRAKE WITH POWER ASSIST
Filed April 18, 1952  3 Sheets-Sheet 3
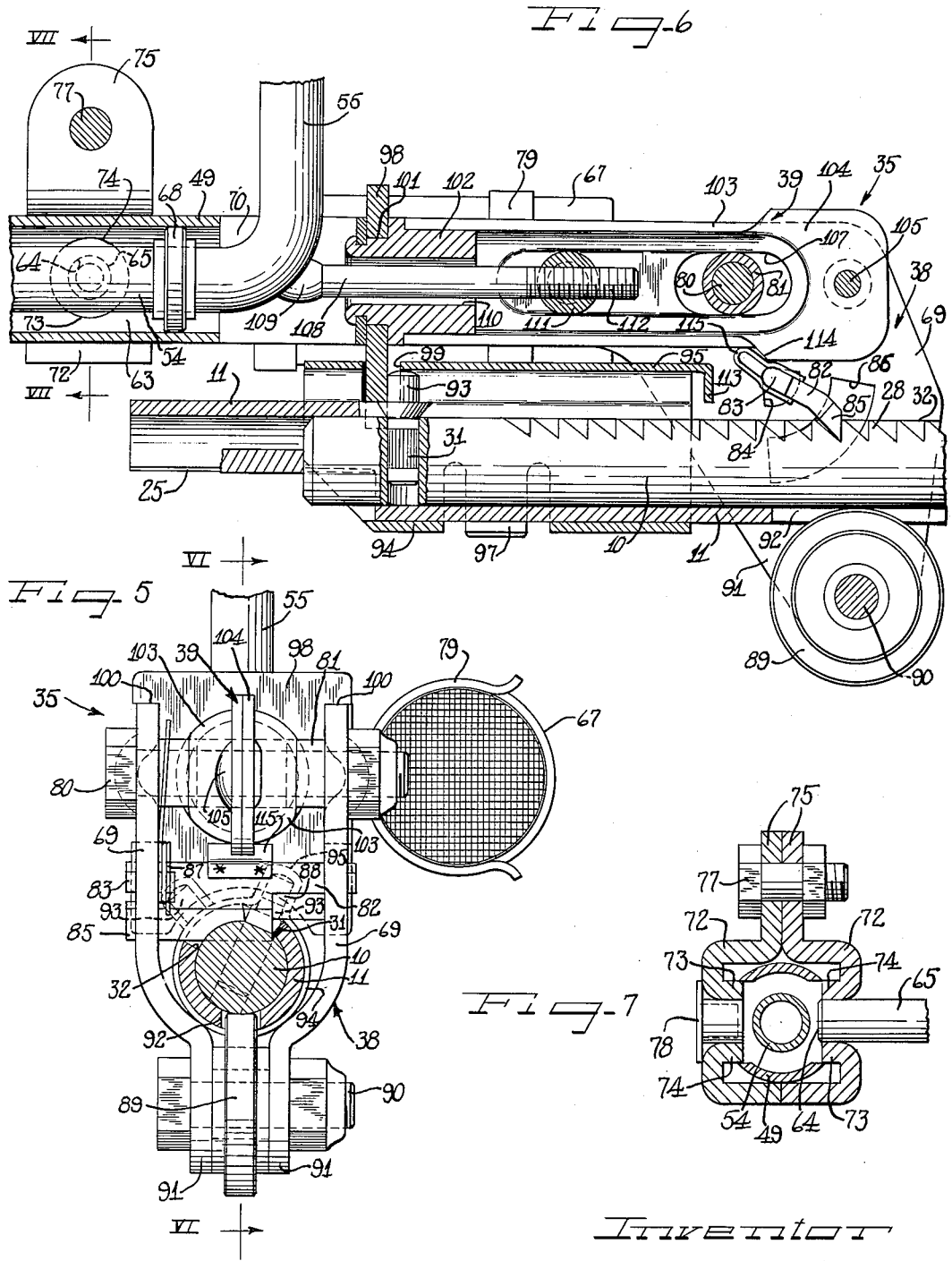
Inventor
Ray A. Sandberg

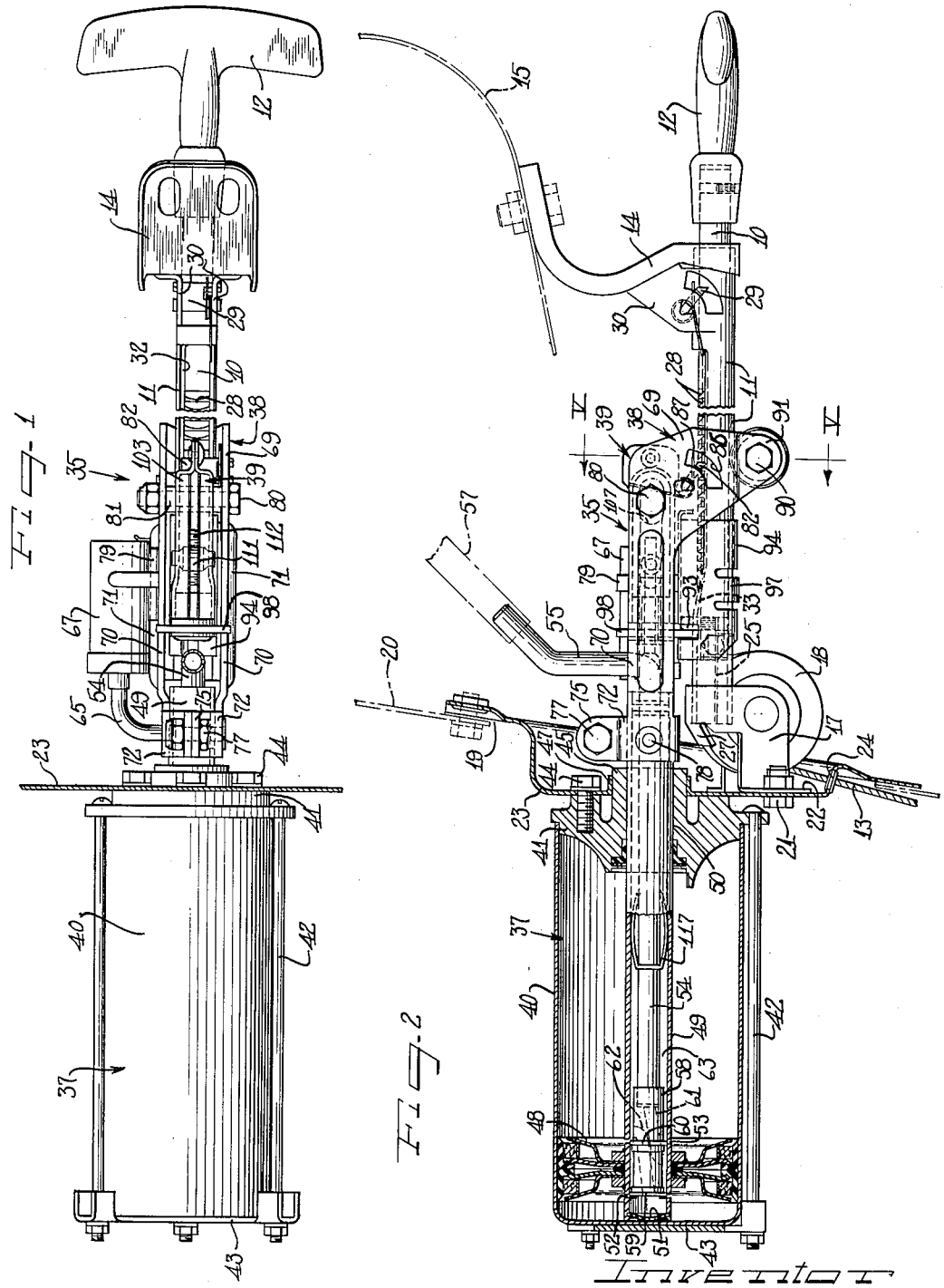

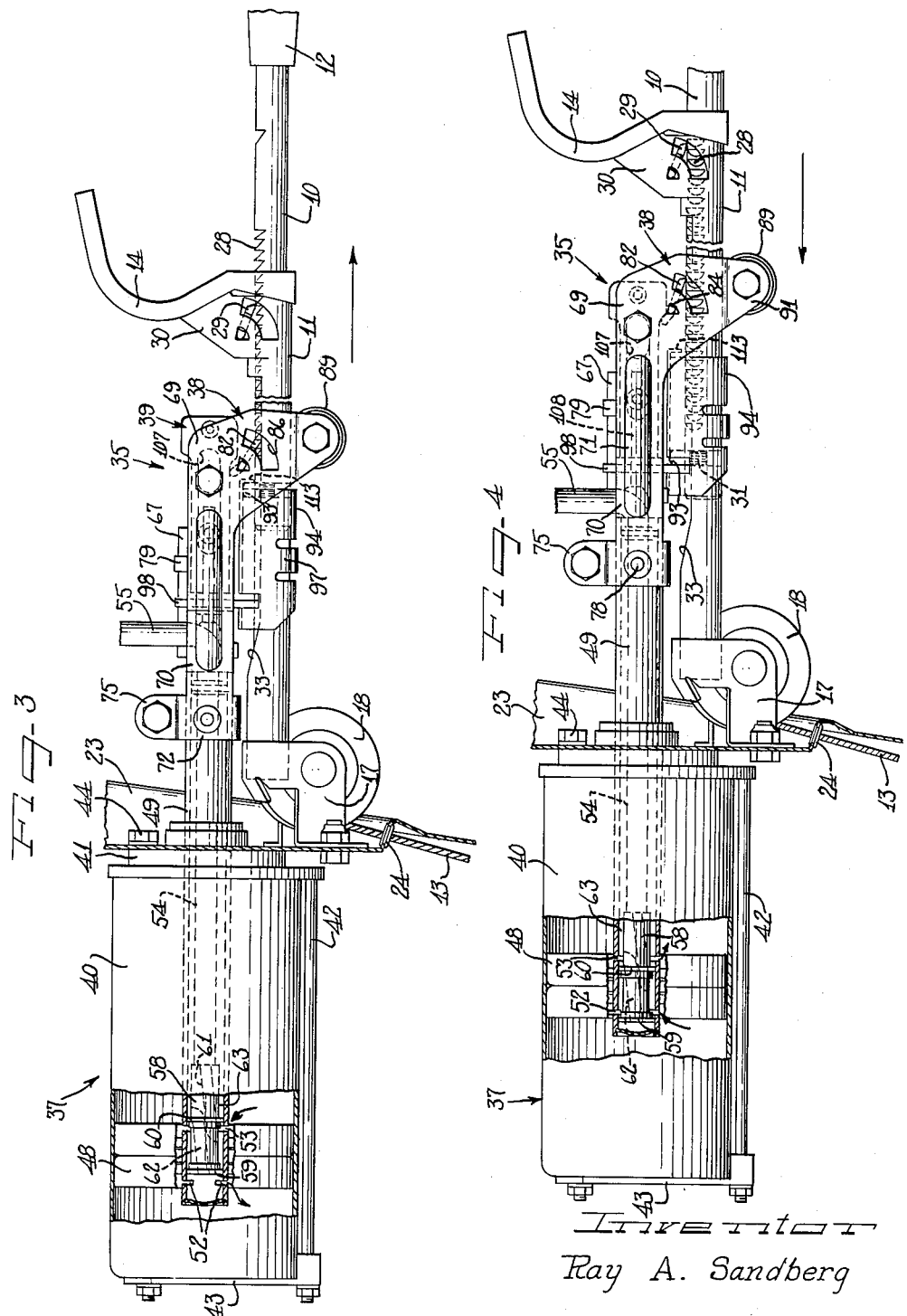

United States Patent Office 2,739,672
Patented Mar. 27, 1956

2,739,672

HAND BRAKE WITH POWER ASSIST

Ray A. Sandberg, Waukegan, Ill., assignor to Houdaille-Hershey Corporation, Detroit, Mich., a corporation of Michigan Application April 18, 1952, Serial No. 282,933

21 Claims. (Cl. 188—106)

The present invention relates to improvements in hand brake mechanisms of the type used in vehicles for parking or emergency braking purposes, and is more particularly concerned with the provision of such brake mechanism having power assist means.

While hand operated brake assemblies for emergency and parking purposes are standard equipment in automotive vehicles, and especially in automobiles, it has been recognized that as the weight of the vehicles has increased, the margin of safety of this type of brake has decreased. That is, the braking force required to bring a heavy vehicle such as an automobile to a halt or to hold the vehicle stationary and against movement down an incline is such that there is a tendency on the part of the average driver to underapply the braking force, and some drivers may actually be physically unable to exert, or under doctor's orders to avoid applying, the necessary brake-setting force to assure safe holding of the brakes.

A fully power-operated emergency or parking brake system of "push button" variety would be an ideal arrangement, but the ever-present liability of power failure increases the danger rather than improving the situation.

For practical purposes, therefore, a compromise must be reached wherein the manual operation of the parking or emergency brake is retained, with a power assist which can generally be counted upon to cooperate with the manual means for setting the brake, but the failure of which will not preclude or jeopardize setting of the brakes.

It is therefore an important object of the present invention to provide an emergency or parking brake which is manually operable but has means to provide a power assist to minimize the manual effort required to apply the brakes.

Another object is to convert the hand brake setting mechanism which has heretofore been utilized mainly for parking brake purposes, into an emergency brake system having braking values substantially greater than where manual effort alone is relied upon.

A further object of the invention is to provide a hand brake system with power assist means which is operable in the manner to which users of such braking systems have been accustomed not only in applying the brakes but also for releasing the brakes.

Still another object of the invention is to enable operation of hand brake mechanism having power assist means without any substantial penalty of excessive added load should the power source fail.

Yet another object of the invention is to provide pneumatic power assist means in a hand brake mechanism.

A still further object of the invention is to provide straight-pull brake actuating mechanism with automatically cooperable power assist means.

Other objects, features and advantages of the present invention will be readily apparent from the following detailed description of a preferred embodiment of the invention taken in conjunction with the accompanying drawings, in which:

Figure 1 is a fragmental top plan view of a hand brake mechanism with power assist, embodying the features of the present invention;

Figure 2 is a fragmental side elevational view, partially in section, of the mechanism of Fig. 1;

Figure 3 is a side elevational view similar to Fig. 2 but showing the relationship of parts during a brake-setting operation of the same;

Figure 4 is a side elevational view similar to Figs. 2 and 3 but showing the mechanism during release of the brakes;

Figure 5 is an enlarged transverse sectional view taken substantially on the line V—V of Fig. 2;

Figure 6 is a fragmentary longitudinal vertical sectional view taken substantially on the line VI—VI of Fig. 5; and Figure 7 is a vertical sectional detail view taken substantially on the line VII—VII of Fig. 6.

By way of illustration, the invention may be embodied in a construction associated with a straight pull brake lever assembly utilizing features covered in my Patents 2,543,509 and 2,543,510, issued February 27, 1951. In such a brake lever assembly, having reference to Figs. 1 and 2, an elongated, cylindrical ratchet rod 10 is reciprocably and rotatably supported by a generally tubular guide housing 11. On the rear end portion of the rod is a handle 12 while suitably attached to the forward end portion of the rod is a brake setting cable 13. The rear end portion of the rod projects rearwardly beyond an escutcheon or bracket 14 fixed on the rear end of the guide member 11 and by which the assembly is attached to an instrument panel 15 in an associated vehicle.

At its forward end portion, the tubular guide housing member 11 is secured to a bracket 17 which supports a freely rotatable pulley 18 over which the cable 13 is trained to extend angularly relative to the axis of the pull rod 10 down through an opening 19 in a fire wall 20 of the vehicle with which the assembly is associated. Fixed operative attachment of the bracket 17 is effected by means of screws or bolts 21 which secure lateral flanges 22 on the bracket to a plate 23 which is secured in closing relation to the fire wall opening 19. A grommet 24 carried by the plate 23 provides a small opening affording close clearance for passage of the cable 13.

To accommodate the pulley 18, the lower forward portion of the tubular guide member 11 is provided with a cut out 25 (Figs. 2 and 6). Looping of the cable 13 out of the peripheral groove in the pulley 18 is prevented by an overhanging forwardly and downwardly extending oblique guard flange 27 on the bracket 17.

For brake setting, the handle 12 is grasped and pulled rearwardly, which pulls up on the cable 13. As the pull rod 10 moves rearwardly in the brake setting operation, a longitudinal series of transverse ratchet teeth 28 ratchet past a yieldable pawl 29 supported operably between upstanding walls 30 on the rear end portion of the guide tube 11. Interengagement of the spring-urged pawl 29 with one of the ratchet teeth 28 holds the pull rod in brake-setting position, from which the pull rod can be released for releasing the brakes by turning of the pull rod, preferably counterclockwise, from a position as shown in Fig. 3 into a rotary position as shown in Fig. 4. This turns the pawl 29 out of the tooth with which engaged, onto a smooth portion of the periphery of the rod so that the rod can move forwardly free of the pawl to brake-releasing position. To assure that the rod 10 will return to ratcheting relation with respect to the pawl 29 automatically at the end of the return or fully released position of the rod, a pin 31 is mounted to project radially from the forward end portion of the rod into a longitudinal slot 32 in the guide housing 11 and having a camming edge 33 at its forward end portion engageable by the pin to move the pin and thereby the rod from the partially turned release relationship thereof as shown in Fig. 4 to ratcheting position as shown in all of the other figures in the drawings. Throughout the remainder of its length, rearwardly from the cam edge 33, the slot 32 is of sufficient width to enable full range of pawl releasing turning movement of the rod 10.

Since in order to provide for effective setting of the brakes on one of the heavier styles of automobiles close to 100 pounds braking force must be applied, it will be appreciated that oftentimes even a person capable of exerting 100 pounds pull with one hand may be inclined to under-tension the brakes, and some persons may be incapable or physically not permitted to exert that much effort. To assure proper setting of the brake under normal circumstances even though only a minimum manual effort is applied, novel power assist means, generally identified by the reference numeral 35, are provided. Herein such means are operative supplementary to the nominal manual effort to provide a total brake setting effort which may exceed twice the manual effort expended. For example, in one practical form, a manual effort of 30 pounds applied through the handle 12 to initiate setting of the brakes may be supplemented by 69 or 70 pounds of assistance by the mechanism 35 to provide a total brake setting effort of 99 to 100 pounds which will quite effectively set the brakes for a heavy automobile.

In accordance with the present invention, the power assist mechanism 35 is so constructed and related to the brake actuating mechanism as to be automatically controlled through manual actuation of the pull rod 10, and, further, to avoid adding any excessive load upon the hand operating mechanism in the event of power source failure. To this end the mechanism 35 comprises a power device or motor 37 arranged to motivate a quick-disconnectable one way clutch or coupling device 38 operatively associated with the pull rod 10, and a motor control device 39 also operatively associated with the pull rod 10.

In the present instance the motor 37 is pneumatically operated. For this purpose, the motor comprises an elongated generally cup-shaped cylindrical casing 40 into the open end of which is fitted a closure cap and bearing member 41 maintained in assembly with the casing, to withstand substantial pressures, by means such as tie bolts 42 and a clamping plate 43 secured against the closed end of the casing by the tie bolts which are anchored to the closure and bearing member 41. The closure member 41 comprises an attachment base which is secured to the mounting plate 23 by means of screws 44, with a hub portion 45 of the member 41 projecting through a flanged aperture 47 in the plate 23 in an operative position above the pull rod 10.

Reciprocable within the cylindrical casing 40 is a piston 48 fixedly secured to the end portion of a tubular piston rod 49 which is axially reciprocably slidably journaled in a cylindrical bearing 50 provided by the closure disk member 41 and the hub 45 thereof so that the piston rod 49 will project rearwardly over and in spaced relation to the adjacent end portion of the rod guiding tube member 11. The inner extremity of the hollow piston rod 49 extends forwardly beyond the piston 48 a limited distance and is closed by a plug or cap 51. Immediately forwardly from the piston 48, the piston rod tube is provided with communication slots 52 disposed in a common transverse plane. Immediately rearwardly of the piston 48 are provided similar communication slots 53 also disposed in a common transverse plane. These slots afford communication between the inside of the tubular piston and the respective forward and rear chambers within the cylinder 40 as divided by the piston 48.

Powered reciprocations of the piston 48, and thereby of the piston rod 49, within the cylinder 40 are effected by creating a vacuum condition on the side of the piston 48 toward which it is desired to have the piston move. For this purpose, a tube 54 extends longitudinally substantially concentrically through the piston rod tube 49 and has an angular nipple portion 55 extending from its rear end portion beyond the rear end of the piston rod tube 49 for connection to a vacuum source such as the intake manifold of the motor of a vehicle with which the unit is associated, a suitable flexible hose 57 of sufficient length to accommodate reciprocal movements of the nipple 55 with the piston unit being provided for operatively connecting the vacuum source with the nipple. At its inner end, the tube 54 is connected to a spool valve 58 of smaller outside diameter than the inside diameter of the piston rod tube 49 and having a spaced annular pair of valve flanges 59 and 60, respectively, of maximum spacing slightly less than the maximum spacing between the communication slots 52 and 53 and in the neutral condition of the assembly disposed in equalized relation between the communication slots.

A passage 61 within the spool valve 58 effects communication between the inner end of the vacuum tube 54 and the space between the valve flanges 59 and 60. When the valve is in the neutral position between the communication slots 52 and 53, as shown in Fig. 2, the valve flanges 59 and 60 block communication between the vacuum space between the flanges and the communication slots 52 and 53. However, when the valve 58 is shifted to the right as seen in Fig. 3, so that the valve flange 60 is moved rearwardly beyond the communication slots 53, communication is effected between the chamber at the rear of the piston 48 and the passage 61 in the valve leading to the vacuum tube 54 so that air behind the piston is sucked out as indicated by directional arrow. At the same time communication with atmosphere is effected between the cylinder chamber forwardly of the piston 48 through the communication slots 52 by way of a passage 62 through the valve 58 opening at the front end of the valve and behind the rear valve flange 60 into an atmospheric air space 63 about the rear end portion of the valve 58 and about the vacuum tube 54 and opening to atmosphere at the rear end portion of the piston rod tube through a port 64, in the present instance provided by an air tube 65 inserted laterally into the end portion of the piston rod tube (Figs. 1, 6 and 7). Preferably the air is drawn through a filter unit 67 to which the air tube is attached so that the inside of the pneumatic unit will be maintained free from foreign matter that might be present in the air drawn into it. It will be observed that the port 64 is disposed forwardly of the rear extremity of the piston rod tube 49 so as to afford an internal space for a centering bearing 68 about the rear end portion of the vacuum tube 54 and which blocks ingress of air into the rear open end of the piston rod tube. The bearing 68 is in sliding engagement with the internal wall of the piston rod tube 49 to enable reciprocal valve control movements of the vacuum tube or rod 54.

When the vacuum control valve 58 is in the position of Fig. 3, of course, the vacuum-created condition in the rear chamber within the cylinder 40 results in atmospheric air filling the forward chamber and the piston will move rearwardly. On the other hand, when the valve 58 is shifted forwardly into the position shown in Fig. 4 so that the vacuum space between the valve flanges 59 and 60 communicates through the communication slots 52 with the forward chamber in the cylinder 40, and the rear communication slots 53 are open to the atmosphere space 63 behind the valve, reversal of the piston 48 will occur by effecting of a vacuum condition in the forward chamber and filling of the rear chamber correspondingly with atmospheric air as the piston moves forwardly. Stopping of the piston is effected by moving of the valve 58 into the neutral position of Fig. 2 wherein it will be observed that the communication slots 52 and 53 are blocked from the vacuum source but are at least slightly cracked to atmosphere so that pressure is equalized on both sides of the piston 48.

Reciprocations of the piston 48 effect corresponding reciprocations of the coupling device 38, and for this purpose the device 38 is operatively attached to the outer end portion of the piston rod member 49. To this end, the coupling device 38 comprises a body structure made up of a pair of operatively opposed similar complementary body plates 69 each of which has an elongated longitudinally extending arm 70 in engagement with the rear end portion of the piston rod member 49 and projecting substantially rearwardly therefrom. Each of the arm portions 70 has a longitudinally reinforcing and stiffening bead 71 intermediate its upper and lower margins.

For attaching the coupling device arms 70 to the piston rod member, the forward end portion of each of the arms is provided with an engagement jaw 72 (Figs. 1, 2 and 7). The jaws 72 are provided with respective inwardly directed coaxially disposed, connector bosses 73 of generally cylindrical, tubular form which engage in complementary diametrically aligned apertures 74 within the wall of the piston rod tube 49. The connection is maintained by securing in clamped together relation respective upstanding ears 75 on the jaws by means such as a screw or bolt 77. This sort of connection assures a positive thrust transmission between the piston rod and the coupling device and affords a ready quick-assembly or dis-assembly expedient. In addition a ready communication means with the interior of the piston rod tube 49 for ingress of air into the space 63 is provided, since the air tube 65 is conveniently secured within one of the tubular connector bosses 73, as best seen in Fig. 7. The opposite tubular connector boss 73 is preferably closed by means of a press-in closure plug 78.

By preference the end of the air tube 65 is fitted into the associated connector boss 73 by a reasonably snug sliding fit so that the filter unit 67 to which it is attached can be readily removed and replaced for cleaning or replacing a suitable filter cartridge therein. Conveniently the filter unit 67 can be mounted on the adjacent coupling member arm 70 by means of a spring clip member 79 mounted on the coupling member arm.

Adjacent their rear ends, the coupling plate members 69 are secured in predetermined spaced relation by means of a bolt 80 extending therethrough and clamping the plates against the respective ends of a spacing sleeve or bushing 81 interposed between the plates. Such connection is effected substantially above the pull rod 10, and the rear portions of the plate 69 extend downwardly on opposite sides of the pull rod guide housing 11.

For effecting a disconnectable clutch coupling between the coupling unit 38 and more particularly between the rear end portions of the plates 69 and the pull rod 10, a pawl 82 is pivotally mounted between the vertical walls provided by the plates 69 and normally engageable operatively with selected ones of the ratchet teeth 28 on the rod (Figs. 5 and 6). By preference the pawl 82 is of generally flattened shape having a pair of laterally extending pivot arms 83 at its upper end or shoulder engageable through respective pivot apertures 84 in the plates 69. Adjacent the lower beveled ratchet-engaging end of the pawl 82 is provided a lateral arm 85 projecting through a clearance aperture 86 in the adjacent plate 69 (Fig. 2) and a coiled torsion spring 87 coiled about the adjacent pivot arm 83 has one end portion anchored under tension rearwardly against the adjacent end portion of the bushing 81 while the opposite end portion bears under tension against the top of the arm 85 to urge the pawl 82 normally toward engagement with the ratchet teeth 28. On the side of the pawl opposite the arm 85, the pawl is provided with a cut-out 88 to clear the adjacent side of the housing tube 11 defining the longitudinal slot 32 therein.

The construction and arrangement is such that when the piston 48 drives rearwardly, the pawl 82 in engagement with one of the ratchet teeth 28 thrusts the pull rod 10 rearwardly. However, forward movement of the coupling device 38 merely causes the pawl 82 to ride in disconnected relation over the ratchet teeth 28. Further, it will be observed that the pull rod 10 can be moved rearwardly relative to the coupling device 38 by ratcheting of the teeth 28 past the yieldably biased pawl 82.

In order to relieve the pull rod 10 from frictional binding against the guide tube housing 11 due to transverse component of thrust when the rod is power motivated by the power assist mechanism 35 through the coupling device 38, a thrust roller 89 is rotatably mounted on a pin 90 which may comprise a bolt secured between a pair of downwardly projecting spaced parallel supporting ears 91 on the plates 69. The location of the thrust roller 89 is underneath and slightly forwardly from the thrust point of the pawl 82 and the periphery of the roller rotatably engages the underside of the rod 10 through a longitudinal clearance slot 92 provided for the purpose in the rod guiding tubular housing 11. Engagement of the roller 89 with the rod 10 is such that the rod can be freely moved both reciprocably and rotatably relative to the roller as may be necessitated in the operation of the assembly.

Operative actuation of the pneumatic motor control valve 58 through the medium of the control device 39 is effected as an incident to manual actuation of the pull rod 10. To this end, the control device 39 is so constructed and related to the pull rod 10 that when the pull rod is manually pulled rearwardly for setting the brake, the control device 39 becomes operative to shift the control valve 58 rearwardly into the position indicated in Fig. 3 for establishing a pneumatic condition to drive the piston 48 rearwardly, while when the pull rod 10 is manually actuated to release the brakes, the control valve 58 will be shifted into the position indicated in Fig. 4. Since it is desirable both at the beginning of the brake-setting manual operation and at the beginning of the manual brake-releasing operation of the pull rod 10 to afford a limited range of movement of the pull rod 10 independently of and relative to the power assist mechanism 35, the valve control means 39 includes an arrangement that may be termed a lost motion or differential movement operating connection with the pull rod.

Herein the laterally extending turn-controlling pin 31 at the forward end portion of the pull rod 10 is utilized for operating the valve control device 39. For this purpose, the pin 31 has a laterally projecting extension 93. Cooperatively related to the pin extension 93 is a tubular elongated shell or housing 94 which is of complementary diameter and slidably mounted on the tubular rod guide member 11. A longitudinal portion of the tubular shell 94 is formed into a radially projecting rib 95 providing an inwardly opening longitudinal channel dimensioned to accommodate the pin extension 93 in freely slidable relation. To avoid undesirable looseness of the shell housing 94 on the tubular housing 11, the shell 94 is preferably slotted transversely at spaced points on the opposite side from the rib 95 to provide a pair of resilient take-up or brake flanges 97 cooperating to grip against the guide tube 11 in limited area and with limited frictional resistance. A lost motion or differential movement connection between the pin extension or boss 93 and the shell 94 and the vacuum tube 54 is effected by mechanism supported by the coupling shell members 69 and including a thrust plate 98 (Figs. 5 and 6). A transverse slot 99 in the forward portion of the rib 95 accommodates the lower portion of the thrust plate 98 which extends transverse to the axis of the pull rod 10 and the piston rod 49 and is slidably supported by the coupling plate arms 70 between which it is carried and with which it engages in appropriate cut-outs or recesses 100 in the side margins of the plate.

Secured fixedly within an aperture 101 in the thrust member 98 coaxially aligned with the piston rod member 49 is a tubular connector flange or body member 102 which projects rearwardly from the thrust member and has secured thereto a pair of opposed, complementary, substantially similar longitudinally elongated shell-like housing plate members 103. Throughout the major portion of their length the shell plates 103 are generally channel-shaped, opening toward one another and the forward end portions of the shell plates are fixedly secured as by welding or brazing to the rearwardly projecting portion of the connector body 102. At their rear ends the shell members 103 are provided with abutting clamping ears 104 secured fixedly together by means of a rivet 105. Vertical support for the rear end portion of the shell assembly is provided by the bushing 81 which extends crosswise through the shell members through respective aligned longitudinally elongated apertures 107 therein. Through this arrangement the valve control shell unit 103, 103 is adapted to move longitudinally relative to and within the coupling body provided by the plates 69.

A connection between the shell assembly 103, 103 and the valve operating and vacuum tube 54 is effected by means of a connecting pin 108 which is fixedly secured at a forward terminal boss 109 thereon to the shoulder provided at the bend juncture between the principal body portion of the tube 54 and the lateral extension 55. The connecting rod 108 extends rearwardly through a central clearance bore 110 in the connector body 102 and into the chamber provided between the shells 103. An adjustable connection between the connecting rod 108 and the control member shell is provided by a trunnion member 111 which is transversely bored and tapped to receive threadedly a threaded rear end portion 112 on the rod 108. The opposite ends of the trunnion member 111 are journaled in the sides of the control shells 103 which may be appropriately apertured in alignment for this purpose.

As pointed out hereinbefore, the apparatus is shown in the neutral fully brake released position in Fig. 2. The similar relationship is shown in Fig. 6. When the pull rod 10 is manually operated to set the brakes, the rod is drawn rearwardly as indicated by the directional arrow in Fig. 3. During a predetermined initial range of brake setting rearward movement of the rod 10, the rod moves relative to the power assist mechanism 35 as permitted by movement of the pin head extension 93 longitudinally rearwardly within the channel provided by the shell rib 95. At the end of such predetermined relative or differential movement, the pin head extension 93 engages an abutment flange 113 projecting across its path integrally from the rear end portion of the rib 95. In the continuing rearward manual movement of the rod 10 the tubular shell 94 is slidably pulled rearwardly along the supporting and guide tube 11 so that the rear shoulder defining the slot 99 in the rib 95 engages and moves the thrust plate 98 rearwardly, thereby also rearwardly actuating the control shell 103, 103 and thus the connecting rod 108 and the valve control tube 54. Movement of the valve control mechanism 39 relative to the coupling device 38 continues until the forward shoulders defining the slots 107 in the control shell members engage the bushing 81 and define the limit of relative movement wherein the valve 58 has been moved rearwardly into the position shown in Fig. 3. Thereupon the piston 48 is motivated to drive rearwardly and the piston rod 49 motivates the coupling device 38 with a rearward power thrust so that the pawl 82 engages one of the ratchet teeth 28 and drives the pull rod rearwardly in brake-setting direction, supplemental to the nominal manual brake-setting effort applied to the rod. The brake-setting power thrust continues to the limit of capacity of the motor 37. It will be understood, of course, that the power factor of the motor 37 can be selected for various capacities in accordance with service requirements.

When the brakes are to be released, and the pull rod 10 is turned to release the pawl 29 from the ratchet teeth 28, and by the same maneuver release the pawl 82 from the ratchet teeth, rearward manual thrust upon the pull rod 10 carries the same differentially rearwardly relative to the power assist mechanism 35 until the pin head 93, now in the left hand position shown in Fig. 5, engages the thrust plate member 98 and in the continuing brake releasing movement, as indicated by directional arrow in Fig. 4, thrusts the plate 98 forwardly. This also moves the valve control mechanism 39 forwardly relative to the coupling device 38 to the limit of the differential movement slots 107 which ultimately engage at their rear shoulders defining the same against the bushing 81 and during which action the valve 58 has been moved toward the forward limit shown in Fig. 4 so that the piston 48 is driven in reverse forwardly toward the initial or starting position shown in Fig. 2.

As the valve control mechanism 39 moves toward its forward differential limit relative to the coupling device 38, a shoulder 114 at the lower rear portions of the attachment ears 104 engages an upward extension piece 115 on the pawl 82, and holds the pawl inactive with respect to the ratchet teeth 28 of the pull rod until the turn-controlling pin 31 has completed its rod return function by riding against the cam edge 33, in the final increment of brake-releasing movement of the pull rod 10. The power assist mechanism thus automatically returns to the starting position as an incident to releasing of the brakes by manual effort.

The general construction and arrangement described meets the requirements for mass production methods of manufacture and assembly and enables the various unit assemblies and sub-assemblies to be factory-produced and readily installed in a vehicle. In service, the various cooperating units and sub-assemblies are well adapted to accommodate manufacturing tolerances and variances within a desirable range of practicality and economy. An example of the provision for tolerance flexibility resides in the connection of the valve controlling stem 108 to the control housing by the pivoted trunnion 111. While desirable relative looseness of certain parts for minimal operative loading is embodied in the structure, nevertheless provisions have been made for elimination of sloppiness or rattling. Exemplary of this are the resilient gripping fingers 97 of the valve control sleeve 94 enabling free reciprocal and turning movements of the sleeve relative to the tubular supporting member 11 in operation but avoiding undue looseness of the sleeve. Moreover, undue freedom of reciprocal movement of the valve stem tube 54 is avoided not only by frictional contact of the spacer and closure flange member 68 thereon but also by a bowed leg expansion spring 117 (Fig. 2) carried by the tube and engaging in resilient frictional relation against the inner wall of the piston rod tube 49.

Operation of the brake-actuating apparatus of the present invention involves only the same manual actions that a regular straight pull brake lever or actuating mechanism entails, and no supplementary buttons or levers or other devices need be actuated by the driver of a vehicle. The driver merely pulls on the handle 12 to set the brakes and he turns the handle and pushes forwardly to release the brakes. The power assist mechanism 35, as described, is fully integrated into and with the operations of the straight pull brake actuating rod 10 to function automatically in coordinated relation thereto. Should there be a power failure no consequential penalty is imposed upon the operator of the brake actuator but fully manual operation of the pull rod throughout its rated brake-setting capacity can be effected.

It will be understood that modifications and variations may be effected without departing from the scope of the novel concepts of the present invention.

I claim as my invention:

1. In a brake-actuating apparatus including a manually operable brake-setting member, a power imparting motor device, means for connecting said motor device operatively to said member, means for controlling operations of said motor device, and means effecting a differential motion connection between said controlling means and said member affording an operative lag between the manual operations of said member and operations of said control means incidental to operations of said member.

2. In a brake-actuating mechanism including a member for setting the emergency or parking brakes of a vehicle by tensioning a brake setting cable, a power device, means for operatively connecting said power device with said member, and means for imparting motivating power from said power device directly operatively to said member during manual operations of said member to afford predetermined cable-tensioning force.

3. In a hand brake apparatus including a straight pull rod having an operating handle at one end and means for connecting the same to a brake setting cable at the opposite end, a motor, and means for operatively connecting the motor in driving relation to the rod for selectively imparting brake-setting thrust to the rod and for thereby transmitting power from the motor for actuating the brake-setting cable.

4. In a hand brake apparatus including a straight pull rod having a handle at one end and means at the opposite end for attaching the same to a brake setting cable and means for holding the rod in incremental brake-setting reciprocal positions, apparatus for imparting brake-setting force to the rod supplementary to manual force applied to the rod through the handle, said apparatus including a motor and means for operatively but releasably connecting the motor to the rod to enable release of the rod as an incident to release from said holding means.

5. In combination in a manual brake-setting apparatus, a straight pull brake setting rod having a manually engageable handle at one end and means at the opposite end for connection to the brakes of a vehicle, a power device, a device for directly operatively disconnectably coupling the power device and the rod for imparting brake-setting thrust to the rod, and additional means operatively related to the rod for controlling operations of said power device.

6. In a brake-actuating apparatus, a brake-setting pull rod operable in one reciprocal direction for setting the brakes and in the opposite reciprocal direction for releasing the brakes, a power device, means operatively related to the rod for controlling operations of the power device, and one way clutch mechanism connecting the power device to the rod for imparting brake-setting thrust to the rod but releasable from the rod to enable overrunning relative movement of the rod to the clutch mechanism.

7. In a brake actuating apparatus including a manually operable brake-setting and releasable member, a power device, means for operatively connecting the power device with said member, means for controlling operations of said power device, and means for operatively connecting said control means with said member including cooperating connecting elements comprising a projection on the rod and a separably cooperable element operatively associated with the power device enabling limited differential movement of said member and said connecting means and control means in the initial brake-setting movement of said member.

8. In a brake actuating apparatus including a manually operable brake-setting and releasable member, a power device, means for operatively connecting the power device with said member, means for controlling operations of said power device, and means for operatively connecting said control means with said member including cooperating connecting elements comprising a projection on the rod and a separably cooperable element operatively associated with the power device enabling limited differential movement of said member and said connecting means and control means in the initial brake-releasing movement of said member.

9. In a manual brake-setting apparatus including a manually operable brake-setting and releasing member, a power unit, means including a disconnectable clutch device for operatively connecting said power unit with said member, means for controlling operations of said power unit movably mounted relative to said clutch device, and means operatively connecting said control means for actuation by said member.

10. In combination in a manually operable brake-actuating apparatus of the kind that will actuate a brake operating cable, a manually operable pull rod adapted to be attached to a brake operating cable, a power unit, a device connecting said power unit operatively directly in motivating relation with said pull rod to impart brake-setting thrust thereto in the operations of said power unit, means for controlling operations of said power unit, and a member carried by said pull rod and operatively related to said control means for operating said control means in the manual operations of said pull rod.

11. In combination in a manually operable brake-setting apparatus including a ratchet pull rod, means for supporting the pull rod, pawl means cooperative with the ratchet structure of the pull rod for holding the rod in incremental brake-setting positions, said ratchet structure and said pawl means being releasable by turning of the rod, and a power mechanism for imparting brake-setting thrust to the pull rod including disconnectable coupling means comprising a releasable pawl also engageable with the ratchet means on said rod but releasable from the ratchet means by turning of the rod.

12. In brake-actuating mechanism, a power assist assembly for imparting brake-setting force to a brake-setting member, a power unit, a coupling device for connecting the power unit operatively directly in motivating relation to the brake-setting member, and a device for controlling operations of the power unit carried by said coupling device and relatively movable thereto and including means for motivation of the control device by said member.

13. In combination in a power assist apparatus for a hand brake actuating mechanism, a power unit, a rectilinearly movable coupling device operatively associated with the power unit, a control device for the power unit mounted for rectilinear operative movement relative to said coupling device, and means rectilinearly movable relative to both said coupling device and said control device and operatively connected with the control device for actuating the latter.

14. In brake-actuating apparatus, a coupling device for attachment to a motor unit and having means for disconnectable coupling with a brake-actuating rod, means relatively movably carried by said coupling device for controlling the motor, and means for operatively connecting the control means and the brake-actuating rod for actuation of the control means by the rod.

15. In brake-actuating apparatus, a pull rod for manually setting and releasing emergency or parking brakes, a guide tube for said rod, a longitudinal slot in said tube, ratchet teeth on said rod exposed through said slot, means on said tube including a pawl engageable with said ratchet teeth for retaining the rod in brake-setting positions and releasable from the ratchet teeth by turning of the rod in said tube, and power assist means having a pawl also engageable through said slot with said ratchet teeth and also releasable from said teeth by turning of the rod.

16. In brake-actuating apparatus, a pull rod for manually setting and releasing emergency or parking brakes, a guide tube for said rod, a longitudinal slot in said tube, ratchet teeth on said rod exposed through said slot, means on said tube including a pawl engageable with said ratchet teeth for retaining the rod in brake-setting positions and releasable from the ratchet teeth by turning of the rod in said tube, and power assist means having a pawl also engageable through said slot with said ratchet teeth, and also releasable from said teeth by turning of the rod, said tube having a second longitudinal slot opposite the first mentioned slot, and said power assist means having a thrust roller engaging the rod through the last named slot on the opposite side of the rod from engagement of the power assist pawl with the teeth of the rod.

17. In combination in brake actuating apparatus, a straight pull manually operable brake-setting rod, a tubular guide member for the rod, the rear end portion of the rod projecting beyond the tubular guide member and having a handle thereon for manual actuation of the rod, the forward end portion of the rod being connectable to a brake-setting cable, a generally U-shaped bracket attached to the forward end portion of said guide tube, a pulley rotatably supported by said bracket, and a mounting plate having an opening therethrough for passage of the cable and to which said bracket is attached.

18. In combination in brake-actuating mechanism, a manually operable brake-setting pull rod, a tubular guide for the pull rod, a power assist mechanism including a motor device and means for releasably coupling the pull rod for power actuation by said power device, a power control device, a sleeve slidably mounted on said tubular guide, means affording a coupling between said sleeve and said control device, and means carried by the rod for motivating said sleeve to operate said control device.

19. In a brake-actuating apparatus, a brake-setting pull rod operable in one reciprocal direction for setting the brakes and in the opposite reciprocal direction for releasing the brakes, a power device, said rod having ratchet teeth thereon, a coupling coactively related to said power device and said rod and having a releasable pawl engageable with said ratchet teeth for driving the rod in the brake setting direction upon actuation of said power device and releasable from the rod by turning of the rod to ride said pawl onto a smooth surface of the rod, said coupling device having a portion thereof extending past the rod to the opposite side thereof from the pawl, and a roller carried by said portion and opposing the surface of the rod opposite said pawl to provide a thrust backing for the rod when the ratchet teeth are operatively engaged under driving thrust by the pawl.

20. In combination in a power assist assembly for imparting brake setting thrust to a brake setting member, a fluid motor comprising a cylinder and a piston and means for mounting the piston in operative relation to a brake setting member, said piston having a hollow stem projecting beyond one end of the cylinder, a control valve within said stem and having an operating element extending through said hollow stem in spaced relation to the internal wall of the stem, said valve operating member being reciprocably movable in said stem and having fluid sealing means cooperative with the outer end portion of the internal wall of the stem, a coupling device for operatively connecting the stem with a brake setting member and comprising means clampingly engageable with the outer surface of the outer end portion of the stem, said means including a generally inwardly directed flange defining an opening, said stem having an opening into which said flange fits interconnectably spaced inwardly from said sealing means, and a fluid duct communicating with the interior of said stem past said flange through said opening.

21. In a manual brake-actuating apparatus including a manually operable brake-setting member having means for connecting the same to a brake-setting cable to place the cable under tension by manual actuation of the member, a motor device, means for transmitting motivating force from said motor device to move said member in brake-setting direction and thereby to apply brake-setting force from the motor through said member to said cable, and means for controlling operations of said motor device responsive to manual actuation of said member to afford predetermined cable-tensioning force.

References Cited in the file of this patent

UNITED STATES PATENTS

| | | |
|---|---|---|
| 1,834,368 | Arbuckle | Dec. 1, 1931 |
| 1,156,290 | Hubbell, Jr. | May 2, 1939 |
| 2,211,043 | Arbuckle | Aug. 13, 1940 |
| 2,212,955 | Price et al. | Aug. 27, 1940 |
| 2,416,222 | Rodway | Feb. 18, 1947 |
| 2,543,509 | Sandberg | Feb. 27, 1951 |
| 2,543,510 | Sandberg | Feb. 27, 1951 |